US008434343B2

(12) United States Patent
Rossiter

(10) Patent No.: US 8,434,343 B2
(45) Date of Patent: May 7, 2013

(54) TESTING OF ASPIRATING SYSTEMS

(75) Inventor: William J. Rossiter, North Somerset (GB)

(73) Assignee: No Climb Products Limited, Hertfordshire (GB)

( * ) Notice: Subject to any disclaimer, the term of this patent is extended or adjusted under 35 U.S.C. 154(b) by 320 days.

(21) Appl. No.: 12/922,716

(22) PCT Filed: Mar. 18, 2009

(86) PCT No.: PCT/GB2009/000745
§ 371 (c)(1),
(2), (4) Date: Sep. 15, 2010

(87) PCT Pub. No.: WO2009/115812
PCT Pub. Date: Sep. 24, 2009

(65) Prior Publication Data

US 2011/0041587 A1 Feb. 24, 2011

(30) Foreign Application Priority Data

Mar. 18, 2008 (GB) .................................. 0805063.5

(51) Int. Cl.
*G01N 1/22* (2006.01)
*G08B 29/00* (2006.01)

(52) U.S. Cl.
USPC ............... 73/1.06; 702/45; 340/628; 340/515

(58) Field of Classification Search ................... 73/1.03, 73/1.06; 702/45; 340/514, 515, 516, 628
See application file for complete search history.

(56) References Cited

U.S. PATENT DOCUMENTS 4,489,590 A * 12/1984 Hadden .......................... 73/1.04
4,764,758 A * 8/1988 Skala ............................ 340/515

(Continued)

FOREIGN PATENT DOCUMENTS

DE 41 25 739 2/1993
EP 0 333 290 A1 9/1989
GB 2 176 600 12/1986

OTHER PUBLICATIONS

International Search Report for PCT/GB2009/000745 dated Jun. 30, 2009.

(Continued)

*Primary Examiner* — Lisa Caputo
*Assistant Examiner* — Punam Roy
(74) *Attorney, Agent, or Firm* — Renner Kenner Greive Bobak Taylor & Weber

(57) ABSTRACT

An aspirating system for detecting the presence of a product representative of a hazard and a method of detecting the presence of a product representative of a hazard in an aspirating system are provided. The system comprises: piping that includes a plurality of apertures spaced apart along the length of the piping; an aspirator for drawing air from outside the piping into the piping through at least one aperture, a detector coupled to the piping for detecting the presence of a product representative of a hazard; a generator of test stimulus for generating the product representative of a hazard; wherein the test stimulus generator is fixed in, near, or on the piping such that in use a test stimulus is provided adjacent to at least one aperture of the piping. A control means can be provided to control the activation of the test stimulus from the generator and the time taken for the test stimulus to reach the detector can be measured.

13 Claims, 2 Drawing Sheets

U.S. PATENT DOCUMENTS

| | | | | |
|---|---|---|---|---|
| 4,827,244 | A * | 5/1989 | Bellavia et al. | 340/515 |
| 5,670,946 | A * | 9/1997 | Ellwood et al. | 340/628 |
| 5,917,417 | A * | 6/1999 | Girling et al. | 340/628 |
| 5,959,188 | A * | 9/1999 | Deutsch et al. | 73/1.06 |
| 6,124,795 | A * | 9/2000 | Bernau et al. | 340/628 |
| 6,462,655 | B1 * | 10/2002 | Ha | 340/515 |
| 6,632,674 | B1 * | 10/2003 | Warburton | 436/8 |
| 6,769,285 | B2 * | 8/2004 | Schneider et al. | 73/1.06 |
| 6,948,352 | B2 * | 9/2005 | Rabbett et al. | 73/1.04 |
| 6,958,689 | B2 * | 10/2005 | Anderson et al. | 340/628 |
| 6,985,081 | B2 * | 1/2006 | Wagner et al. | 340/628 |
| 7,377,147 | B1 * | 5/2008 | Scheffler et al. | 73/1.06 |
| 7,661,290 | B2 * | 2/2010 | Gu et al. | 73/1.03 |
| 7,852,227 | B2 * | 12/2010 | Pepper et al. | 340/628 |
| 8,224,621 | B2 * | 7/2012 | Ajay et al. | 702/176 |
| 2004/0035179 | A1 | 2/2004 | Koch | 73/1.05 |
| 2005/0204799 | A1 | 9/2005 | Koch | 73/1.06 |
| 2006/0042351 | A1 * | 3/2006 | Liu et al. | 73/1.06 |
| 2007/0008157 | A1 | 1/2007 | Siemens et al. | 340/577 |
| 2007/0168140 | A1 | 7/2007 | Knox | 702/45 |
| 2010/0057401 | A1 * | 3/2010 | Scheffler et al. | 702/182 |

OTHER PUBLICATIONS

Written Opinion for PCT/GB2009/000745 dated Jun. 30, 2009.

UK Intellectual Property Search Report for priority application No. GB0805063.5 dated Jun. 26, 2008.

* cited by examiner

TESTING OF ASPIRATING SYSTEMS

The present invention relates to aspirating detection systems and particularly to apparatus for testing such systems.

An aspirating detection system is one in which air and particulate representative of a hazard is drawn through one or more sampling points into a pipe for transport to one or more detectors or sensors by an integral pump, fan or aspirator. The most common use of these systems today is for detection of smoke and the system is known as an aspirating smoke detection system—though the application of aspirating detection systems (ADS) can of course be used for other hazards.

Aspirating systems often incorporate smoke sensors of much higher sensitivity than those used in the more common 'point type' smoke detection and can be designed to respond to much lower levels of combustion products than alternative forms of detection. As such they are known for their use in the early warning of fire or as enhanced smoke detection systems but, additionally, are used where access is restricted or difficult or for aesthetic reasons. They are also employed where exceptional ceiling heights are involved or where there is risk of physical damage as well as in hazardous areas or certain extreme environments.

Typically the air in an aspirating system is drawn by the aspirator through a number of sampling points in a pipework system covering the protected area. These sampling points might be drilled directly into the main (or extended) sampling pipe or might comprise capillary tubes from the main sampling pipe. Aspirating pipe is typically 25 mm (approx 1 inch) in diameter and the sampling points are a fraction of this diameter. A correctly designed aspirating system needs to ensure that the air and combustion products are efficiently transported from the protected area to the sensor (with the sensitivity of each sampling point being dependant on the amount of air entering each hole relative to the total flow through the detector (and of course its sensitivity)). Generally, the objective is to achieve equal amounts of air entering each hole so that the system is "balanced" within practical limits.

Within all of the above effective aspirating system function depends on:

1. The sensing element or detector
2. The air mover (e.g. fan or aspirator)
3. The sampling device
4. The pipe work system As with all fire systems, aspirating systems require regular maintenance (something that can be a legal requirement) and, typically, this maintenance should be carried out at least annually—although the particular use of the premises may dictate more frequently.

One of the key tests within a maintenance regime is the functional test (the objective being to ensure that the aspirating system and its associated pipework are still operational). While, ideally the functional test might be achieved by introducing particulate indicative of smoke into each sampling point in turn and verifying individual responses at the detector this is often not possible due to restricted access or other constraints. An effective and accepted alternative is, therefore, 'verification of transport time'.

In commissioning an aspirating system designed to conform to prescribed standards, a test is typically made of the particulate transport time from the furthest sampling point in the aspirating system to the detector. Generally this time should not exceed 120 seconds for a pipe run typically no more than 100 m in length (although times and lengths can be shorter as well as longer). Where possible, this measured transport time should be compared to the predicted design transport time as a check of the design integrity and to confirm that the pipework is installed as intended. If this commissioning transport time is also recorded then subsequent such verifications can be compared with these previously recorded results and against acceptable deviations in order that a judgement can be made of the ongoing system integrity, efficacy and effectiveness.

Many aspirating systems use physical filters to remove larger dust particles from the air sample before it is analysed by the detector(s). These filters may be incorporated into the aspirating equipment or installed in the pipework upstream of the detector. They can reduce the risk of unwanted alarms caused by dust/dirt and can minimise contamination of the detector in particularly harsh environments. Regular testing of the system can help verify that the condition of the filter is not compromising system performance.

Measuring transport time in an aspirating system typically involves introducing a small quantity of stimulus indicative of the hazard (such as smoke) into the furthest sampling point (or a dedicated test point) and measuring the time between first introducing the stimulus and observing a "reaction" (perhaps the first response of a bar graph or the first indication of an alarm) from the system.

In reality, various important challenges/obstacles are associated with such good maintenance practice. The most recognised of these reside in the characteristics of the stimulus used for the test as such stimulus needs to be appropriate to test the system correctly. In the case of aspirating smoke detection systems the particle lifetime needs to be sufficiently long to last the transit time and still initiate an alarm at the end. It must also be effectively non-contaminating to the system and its components (including filters). Account also needs to be taken of the sensitive environments in which these systems are often installed.

Further, the functional test also needs to be confined to no more than one sampling point at a time (a stimulus source that is 'too large' may affect more than one sampling point and invalidate the test results).

In comparing data from one test with another repeatability can become a factor and it is best, not only that the test stimulus be controlled, but also that the same controlled stimulus be used from one test to another.

Finally there is the challenge of recording the data. Information needs to be recorded accurately—ideally at the time of the commissioning test—and then be available from one test to the next, preferably with data on acceptable deviations from the original designer of the system and also readily available for interpretation purposes.

At this time there is no generally accepted method of performing the above. The aerosol canisters of synthetic smoke that are widely used for functional testing of point smoke detection systems either do not have appropriate particle characteristics or sufficiently long lifetime to activate aspirating smoke detection systems or can contaminate sampling points, pipe work and/or filters and other components. They are also almost invariably 'uncontrolled in their use' and subject to frequent 'over spraying' with widespread attendant contamination issues. The 'wire burn test' specified by standards as part of performance testing for certain aspirating systems requires high amounts of electrical energy and can produce toxic and noxious smoke and is often not considered suitable for use and most other forms of smoke or particulate introduction involve some form of combustion and/or are 'uncontrolled' in the characteristic and quantity of particulate stimulus that they produce. Additionally, the location that the particulate source is introduced can vary. Indeed, in order even to access the end of the line point cost-effectively and safely often requires an extension of the pipe run to an easily accessible location at the time of system installation. This can result not only in excessive costs (the pipework installation expense is significant), but also unnecessary protrusions of pipe work with undesirable aesthetic consequences. Further, the extended pipe work is exposed for accidental damage, and ultimately, the particulate source can be obliged to travel further than necessary and certainly further than what might have otherwise been the last sampling point.

Finally, there is no known automated link between production of the particulate source and recording of the transport time either at commissioning or on an ongoing basis or of interpreting the data against acceptable tolerances.

The present invention provides an aspirating system for detecting the presence of a product representative of a hazard, the system comprising:

- piping that includes a plurality of apertures spaced apart along the length of the piping;
- an aspirator for drawing air from outside the piping into the piping through at least one aperture,
- a detector coupled to the piping for detecting the presence of a product representative of a hazard;
- a generator of test stimulus for generating the product representative of a hazard;
- wherein the test stimulus generator is fixed in, near, or on the piping such that in use a test stimulus is provided adjacent to at least one aperture of the piping.

Such an arrangement can render it possible to determine whether there are problems with the detection system. Variations in the amount of stimulus required to activate the detector and/or the time taken to do so relative to expectations, requirements or previous tests and/or measurements can indicate a number of problems that might include for example pipe, aperture (sampling point) blockages, filter or detector contamination, fan or aspirator issues or any combination of the above and which would require the system to be further investigated to establish the cause.

Such a test system is preferably under electronic and software control, with which outputs from the system itself can be communicated or connected.

Preferably, the test generator will be consistently placed or permanently fixed in or in close proximity to (preferably slightly ‘upstream of’) the last sampling point on the pipe run of the aspirating system. In this manner, it is possible to determine whether there are any problems in the pipework on the basis of the time taken for the product representative of the hazard to reach the detector. In one embodiment it might be separate from the aspirating system, relying on forced convection of product representative of a hazard from the generator or the suction of the aspirating system to move the product representative of a hazard from the generator to the aspirating system. In another it may be physically connected to, or form part of, the aspirating system.

Fixing the generator in position has a number of advantages. One of these is that the same test generator is used from one test to the next. Not only can this help assure integrity of the test but also consistency and, with appropriate controls, repeatability from one test to the next.

Correct position and control of the generator also helps ensure that product representative of a hazard enters only the last sampling point or, if inside the pipe, upstream of the last sampling point and that tests results are not invalidated by too large a sample (otherwise entering more than one sampling point).

Further by fixing the generator and activating it remotely, the additional pipe run that is otherwise required to extend the aspirating system and provide a test point within safe, easy and convenient access is negated. Not only does this potentially remove pipework from possible damage but it saves considerable money, has aesthetic benefits and also ensures that the product representative of a hazard (and thus transit time test) need be carried along only the length of pipe run that is required for the original purpose of detection rather than testing.

In a first embodiment, the power is supplied to the generator by a battery. This battery could either be integral to the generator or connected to it by wires. In addition, the same battery could be carried from installation to installation by a maintenance engineer while in another it may be permanently connected to the generator or incorporated as part of the generator. In a further embodiment, power for the generator may be drawn from the same power sources that supply the aspirating system itself. Aspirating smoke detection systems are usually fed by battery backed mains power. Typically the internal operating voltage is 24v and this could be considered a suitable power source for the test system.

In order that the present invention is more readily understood, embodiments will be described by way of example only with reference to the accompanying drawings in which.

An aspirating system is typically utilised in an area which is to be protected and monitored for the detection of smoke or any type of product that indicates that a hazard such as a fire is present although it is recognised that the potential field of applications is wider. Hereinafter the description will refer to smoke being the product which is to be detected. The area comprises a pipe network with a series of interconnected pipes leading to a detector at the hub of the network.

Figure 1:
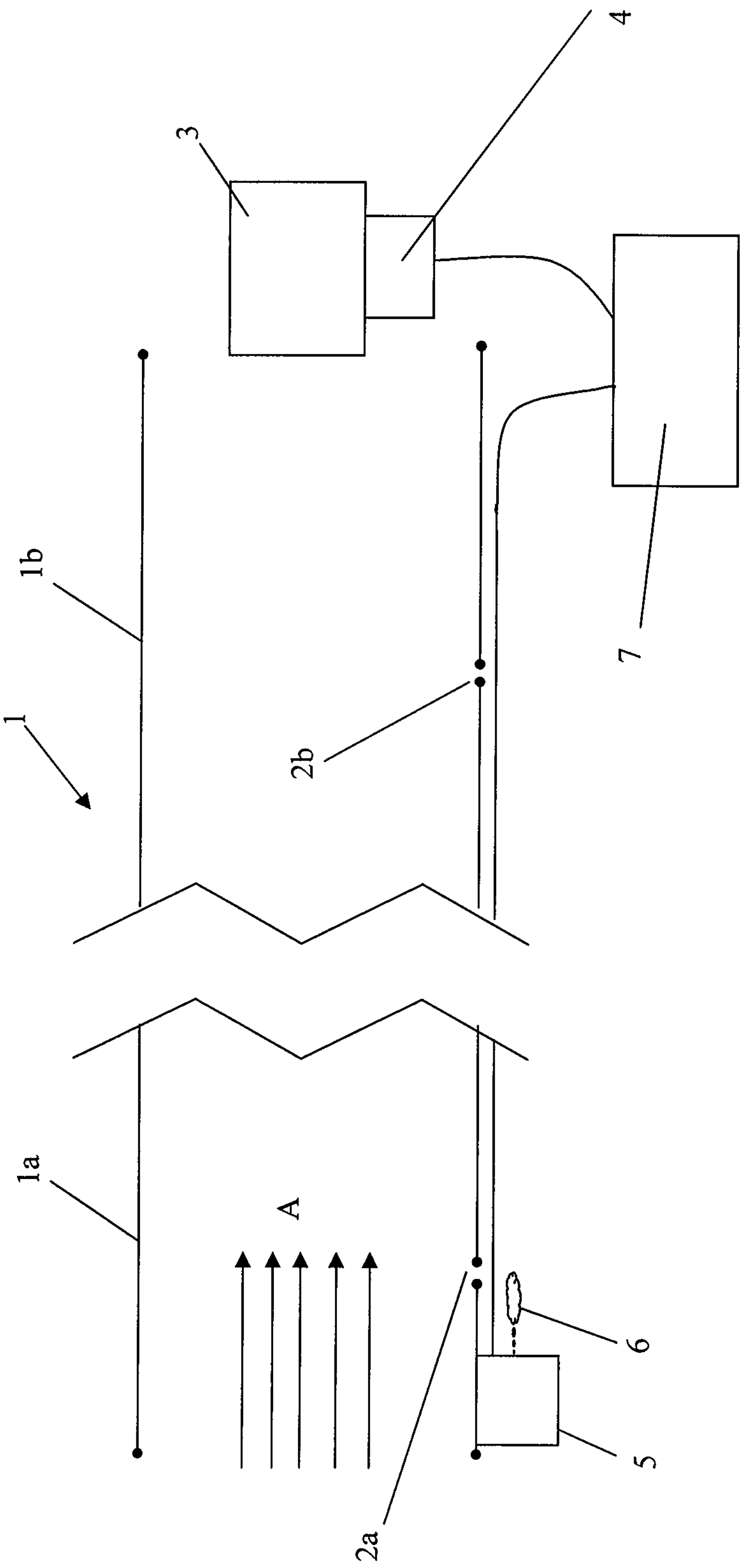
FIG. 1 shows a schematic view of an aspirating smoke detection system including a particulate generator according to a first embodiment of the present invention.

FIG. 1 shows an aspirating system 1 and part of piping used in the aspirating system. Distal pipe section 1*a* shows part of the piping which is located at one end of a pipe network which is located in an area to be monitored. Proximal pipe section 1*b* shows part of the piping which is located nearest to a smoke detector 3 which detects the presence of smoke. Although not shown it will be appreciated that the section 1*a* and 1*b* are connected via further pipe sections.

The pipe section 1*a* has a sampling point 2*a* which is drilled directly into the pipe section 1*a* thereby forming an aperture. It will be appreciated that there may be a plurality of sampling points in any one pipe section. In addition, the pipe section 1*b* has at least one sampling point 2*b*. Further, the sampling point can be in the form of a capillary tube extending from the pipe section 1*a* or 1*b*. The aspirating system 1 takes the form of a standard aspirating system in so far as there are a plurality of sampling points in the pipe network.

Smoke detector 3 is a smoke detector which is located at the end of the pipe section adjacent the proximal pipe section 1*b* such that any smoke that travels through the pipe network to the proximal pipe section 1*b* can be detected by the detector. Information relating to the construction of the smoke detector is not explained and will be known to those skilled in the art. It will be appreciated that the diameter of the pipe sections 1*a*,1*b* compared to the size of the detector 3 is not to scale but the pipe diameter is exaggerated in FIG. 1 to clearly show the features.

An aspirator 4 is provided which draws in air into the aspirating system 1. Such an aspirator is preferably a fan. The aspirator 4 is located in a position that allows air to be drawn into the aspirating system through the sampling point 2_a_ and in FIG. 1, it is located at the end of the proximal pipe section 1_b_ such that air is drawn through the sampling point 2_a_ and travels towards the detector 3 in a direction A. Air is actively drawn into the pipe network so that smoke can be detected.

A particulate generator 5 is provided on the distal pipe section 1_a_ adjacent the sampling point 2_a_ and on the outside of the pipe section 1_a_. By particulate generator, we mean a generator that can generate particles which are representative of smoke particles. This is not necessarily smoke itself but created by using a test medium having similar characteristics to smoke particles. It will be appreciated that a plurality of generators 5 may be provided each located at different sampling points in the aspirating system 1.

One can envisage a particulate generator of the type described in patent publication WO 0227293. Indeed tests show that heating a crucible of high grade paraffin wax with an electrical resistor can, under appropriate controls, result in a particulate of suitable characteristic and lifetime (and which is similar to the type used in smoke detector performance standards conducted by 3$^{rd}$ party test houses). Other methods of particulate generation that result in an appropriate particle characteristic can of course also be used but the heated and condensed paraffin wax has been shown to produce a particle of appropriate size, characteristic and quality that, under electronic and software control, is effectively benign to the system and its components while also having a long enough lifetime to endure transit time of the aspirating system 1. That is, the particles should be of a sufficient size, characteristic and quality to be able to reach the detector under test from the location at which they are expelled from the particulate generator 5.

As shown in FIG. 1, the particulate generator 5 is positioned in a position relative to the sampling point 2_a_ such that particulate 6 can be expelled from it and drawn into the pipe section 1_a_. It will be appreciated that the particulate generator can be placed in the pipe or permanently fixed in close proximity to (and slightly 'upstream of') the last sampling point on the pipe run of the aspirating system 1. In another embodiment it might be separate from the aspirating system 1 relying on forced convection of particulate from the generator or the suction of the aspirating system 1 to move the particulate from generator 5 to aspirating system 1. In another it may be physically connected to, or form part of, the aspirating system 1.

Electrical power is required and, in the present embodiment, the power is supplied by a battery (not shown) that supplies the particulate generator 5. This can be integral to the generator or connected to it by wires. In one embodiment, the same battery could be carried from installation to installation by a maintenance engineer while in another it may be permanently connected to the generator 5 or incorporated as part of the generator 5.

In a further embodiment, power for the generator 5 may be drawn from the same power sources that supply the aspirating system 1 itself. Aspirating systems are generally fed by battery backed mains power. Typically the internal operating voltage is 24v and this could be considered a suitable power source for the test system.

Figure 2:
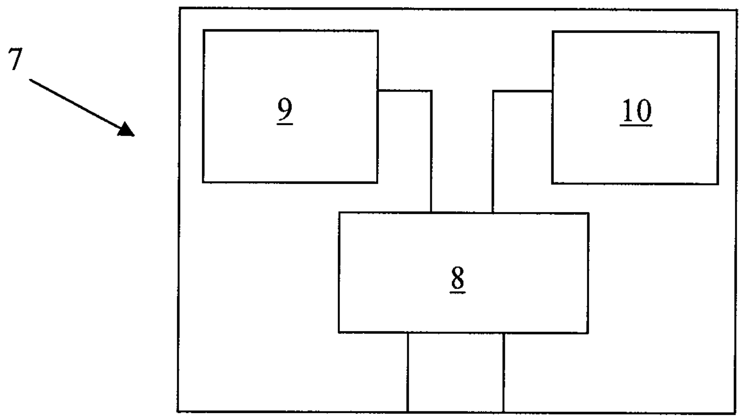
FIG. 2 shows a schematic view of the control unit of FIG. 1.

A control unit 7 is connected to the detector 3 and aspirator 4 as well as the particulate generator 5. In this embodiment, the connection is wired however it may be wireless. With reference to FIG. 2, the control unit 7 comprises a processor 8 to control the functioning of the control unit 7. The control unit 7 is adapted to control the activation and deactivation of the particulate generator 5 such that the activation can occur at a specific instance and, if necessary, manner.

The control unit 7 further comprises a timing device 9 which communicates with the detection system in order to measure the time taken for particulate expelled from the particulate generator to reach the detector 3 and cause alarm activation. Accordingly, the system 1 can accurately determine transit time of the particulate 6 expelled from the generator 5.

The control unit 7 comprises a storage means 10 such as a flash memory to enable results to be stored at the control unit 7 or by co-ordination with the detection system data may be stored within or utilised by the control equipment of the detection system itself. Alternatively or in addition, the control unit 7 can be directly connected to a computing device (not shown) enabling all results to be stored remotely.

In this way, the time taken from particulate generation to alarm response can be measured in an automated manner, bringing with it not only greater accuracy than manual timing but also the facility for storage of results.

The incorporation of software control to the test system brings with it a number of advantages and possibilities. Producing the particulate under electronic and/or software control enables precise quantities to be generated thereby helping ensure not only consistency but also that the aspirating system 1, and other parts of the system or indeed the installed environment are not contaminated. The results of the transit time determination can be utilised to adjust or clean the aspirating system automatically or otherwise.

If appropriate, different profiles and concentrations of particulate could be employed for different tests. For example this could be achieved for the different classes of sensitivity that comprise the aspirating system or for calibration testing.

Further, by storing the results of the test, recorded transit times can be compared with previous response times as well as the original commissioning time. In this way the acceptable deviation data can also be evaluated, automatically if desired and, with appropriate controls and links to the aspirating system 1, the aspirating system 1 itself adjusted as a function of the maintenance test results or other action taken as is deemed necessary.

The control unit 7 can be situated in a convenient location, and preferably at the control point for the aspirating system 1 since, as well as power potentially being drawn from the same source of power as for the aspirating system 1, a connection will be made between the aspirating system 1 alarm outputs and test system inputs. However, all of this control, interpretation and potential action could, if desired, could be accomplished remotely—either locally by use of IR, radio or Bluetooth® connections that comply with quality and interoperability standards established by Bluetooth SIG. Inc. of Kirkland, Wash., USA for example or, at the end of an interne connection, at great distance from the physical site itself.

Figure 3:
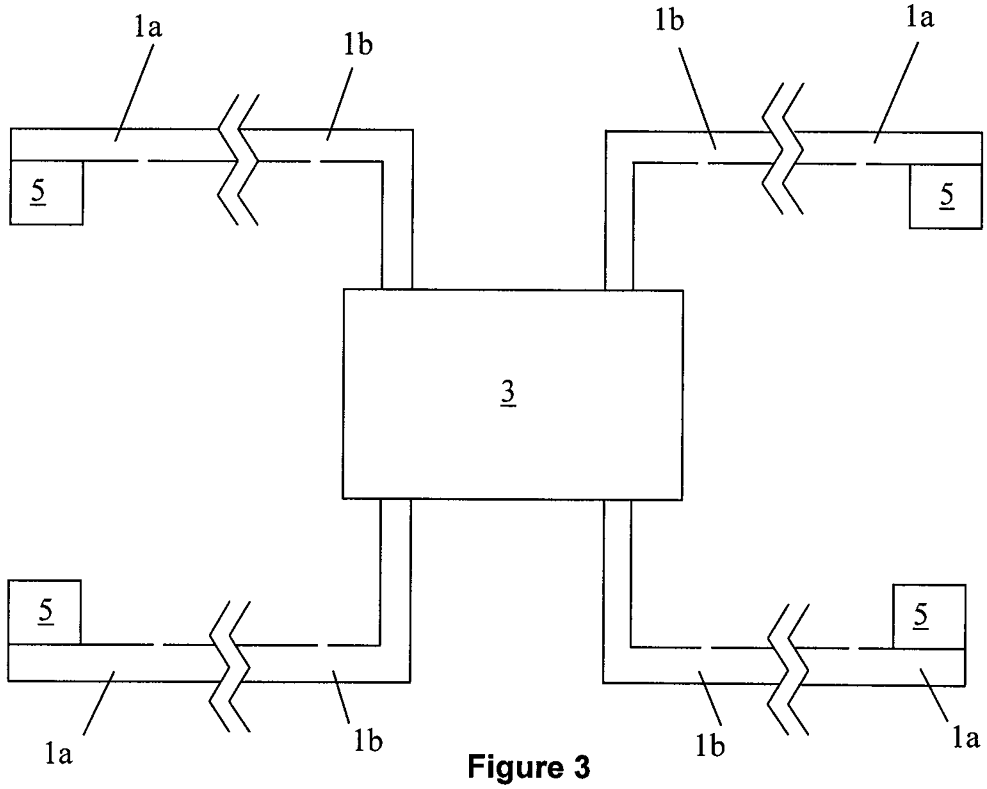
FIG. 3 shows a pipe network formed of a plurality of pipe runs shown in FIG. 1.

FIG. 3 shows a pipe network formed of a plurality of pipe runs based on the pipe run shown in FIG. 1. Each pipe run has at least the pipe section 1_a_,1_b_ and the detector 3 is located at the end of pipe section 1_b_. The particulate generator 5 is located at the end of pipe section 1_a_. The detector 5 is considered to form the hub of the pipe network in that each pipe run leads to it. In this embodiment there are four pipes but it will be appreciated that any number of pipe runs could be provided.

The preferred embodiment has been described in relation to smoke detection aspirating system. However, it will be appreciated that other types of aspirating systems could be used in the present invention.

The invention claimed is:

1. An aspirating system for detecting the presence of a product representative of a hazard, the system comprising:
   - piping that includes a plurality of apertures spaced apart along the length of the piping;
   - an aspirator for drawing air from outside the piping into the piping through at least one aperture,
   - a detector coupled to the piping for detecting the presence of a product representative of a hazard;
   - at least one test stimulus generator of test stimulus for generating the product representative of a hazard;
   - a control unit for controlling the activation of the test stimulus from the at least one test stimulus generator; and
   - a timing device for measuring the time taken for the test stimulus to reach the detector following activation by said control unit,
   - wherein the at least one test stimulus generator is fixed in, near, or on the piping such that in use the test stimulus is provided adjacent to at least one aperture of the piping.

2. The system of claim 1 wherein the system further comprises storage means for storing data indicative of the time taken by the timing device.

3. The system of claim 2 further comprising a computing device for comparing the data from the storage means with predetermined data in order to determine comparison data of the time taken for the test stimulus to reach the detector.

4. The system of claim 3 wherein said computing device uses the comparison data to adjust or clean the aspirating system automatically.

5. The system of claim 1 wherein said control unit further comprises a real time clock to control activation of the at least one test stimulus generator on a scheduled basis.

6. The system of claim 1, further comprising a plurality of sections of piping joined to form a pipe run and one or more generators, wherein each said generator is located at one end of each and/or any pipe run.

7. The system of claim 6 wherein the detector is located at the other end of the pipe run.

8. The system of claim 6 or 7 wherein there are a plurality of pipe runs that form a piping network and the detector is at the other end of each pipe run to form a hub of the piping network.

9. The system of claim 1 wherein the test stimulus generator comprises a battery for providing power to the test stimulus generator.

10. The system of claim 1 further comprising a power source to provide power to the aspirator and the detector, wherein the power to the test stimulus generator is provided by the same power source that provides power to the aspirator and the detector.

11. The system of claim 10 wherein the power source is mains AC power.

12. Method of detecting the presence of a product representative of a hazard in an aspirating system comprising:
   - providing piping that includes a plurality of apertures spaced apart along the length of the piping and a detector coupled to the piping and a detector coupled to the piping;
   - fixing a test stimulus generator in, near or on the piping; and
   - controlling the activation of the test stimulus from the test stimulus generator including:
     - providing test stimulus representative of a hazard adjacent to at least one aperture of the piping;
     - drawing in air from outside the piping into piping through at least one aperture;
     - detecting the presence of the product representative of a hazard; and
     - measuring the time taken for the test stimulus to reach the detector following activation of the test stimulus.

13. An aspirating system for detecting the presence of a product representative of a hazard, the system comprising:
   - piping that includes a plurality of apertures spaced apart along the length of the piping;
   - an aspirator for drawing air from outside the piping into the piping through at least one aperture;
   - a detector coupled to the piping for detecting the presence of a product representative of a hazard;
   - a generator of test stimulus for generating the product representative of a hazard, wherein the test stimulus generator is fixed in, near, or on the piping such that in use a test stimulus is provided adjacent to at least one aperture of the piping; and
   - a power source to provide power to the aspirator and the detector, wherein the power to the test stimulus generator is provided by the same power source that provides power to the aspirator and the detector.

* * * * *